United States Patent
Mertens

Patent Number: 5,573,031
Date of Patent: Nov. 12, 1996

[54] AIR BLEED VALVE

[75] Inventor: Helmut Mertens, Saarbrücken, Germany

[73] Assignee: HYDAC Technology GmbH, Sulzbach/Saar, Germany

[21] Appl. No.: 397,200

[22] PCT Filed: Jan. 13, 1994

[86] PCT No.: PCT/EP94/00082

§ 371 Date: Mar. 7, 1995

§ 102(e) Date: Mar. 7, 1995

[87] PCT Pub. No.: WO94/18480

PCT Pub. Date: Aug. 18, 1994

[30] Foreign Application Priority Data

Feb. 10, 1993 [DE] Germany ............... 43 03 799.2

[51] Int. Cl.⁶ .................... F16K 24/04; F16K 31/24
[52] U.S. Cl. ................................. 137/202; 137/448
[58] Field of Search ......................... 137/202, 448

[56] References Cited

U.S. PATENT DOCUMENTS 3,796,227  3/1974  Fujiwara ................... 137/202
3,888,274  6/1975  Weston .................. 137/202 X

FOREIGN PATENT DOCUMENTS 2032552  11/1970  France.
7738268   5/1978  Germany.
2241645   3/1993  Germany.

Primary Examiner—Gerald A. Michalsky
Attorney, Agent, or Firm—Roylance, Abrams, Berdo & Goodman, L.L.P.

[57] ABSTRACT

An air bleed valve has a movable float in a valve housing and a lever system with a valve plate to open and close an outlet. The valve plate acts with an energy accumulator. The lever system imparts to the valve plate a tipping motion which opens or closes the outlet in a continuous cycle. The lever system has a slide lever supporting the valve plate at one end. The lever other end is guided in a guide in the float. One projection faces the outlet and forms a pivot about which the valve plate can be tipped. This provides a compact air bleed valve which operates reliably and can safely be used for both higher pressures and for lower-density media.

12 Claims, 2 Drawing Sheets

AIR BLEED VALVE

FIELD OF THE INVENTION

The present invention relates to an air bleed valve having a float movable in a valve housing, and having a lever system with a valve plate for opening and closing an outlet. The lever system cooperates with a power source or energy accumulator. The valve plate undergoes a tipping movement by means of the lever system to open and close the outlet opening in a continuous cycle.

BACKGROUND OF THE INVENTION

Automatic air bleed valves are used during operations to remove air from installations in which a fluid flows, and to allow encapsulated air to escape during operation of such an installation. Commercial air bleed valves, as are in use for example in heating installations, are generally set up to operate under operational pressures up to a maximum of 7 bars, and therefore, are unsuitable for use in hydraulic installations where higher pressures generally prevail.

Most of these air bleed systems work with floats which are moved by the operating medium and which, through a mechanism, operate a valve to release the encapsulated air into the environment. Thus, power or force is obtained for operational use through the float arrangement or through the float specific weight- An air bleed system in a hydraulic system, as a result of the low density of the operating media, clearly has less setting or adjusting forces easily available for operation of the opening mechanism. This leads to disturbances in operation. Particularly, failing to accomplish complete closing of the conventional air bleed valve with a setting in a hydraulic range leads to undesired escape into the environment of air with operating medium carried in it, comparable to an aerosol. Such leads to endangerment of the health of the operators entrusted with monitoring such hydraulic installations.

With a different class of air bleed valve, as disclosed in German Utility Patent 77 38 268, the float raises the valve plate completely from the outlet opening by means of the lever system. A progressively greater linear passageway aligned in a plane is required of the valve plate, until complete closing is attained. This requires an air bleed valve of very large structure. In addition to the undesired aerosol discharge, the closing process does not proceed in a controlled manner. Thus, fluid discharge from the outlet opening into the environment is possible. Upon opening, it can even lead to inadvertent escapements, which make the opening process difficult or even entirely impossible.

In an air bleed valve of the same class, as in German Publication 22 41 645, the lever system is formed of a valve rod arranged in the valve plate, horizontally when it is in the closed position. A spherical float moves the disk-shaped flat valve plate by pivoting for opening and closing a conical outlet opening. Because of the high operational forces required for the lever system, that float is constructed as a large member. The float, in combination with the transverse lever rods, leads to an air bleed valve of large construction. The valve plate is formed of a flat sheet which can be moved away from the outlet opening dependent upon the pressure forces only with difficulty. This can lead to escapements from the area of the lever system and to negative effects on the operation of the air bleed valve.

SUMMARY OF THE INVENTION

Objects of the present invention are to provide an air bleed valve which can be of small construction, which does not have the disadvantages of conventional air bleed valves and which can be used where higher pressures and lower density media prevail.

The foregoing objects are basically obtained by an air bleed valve comprising a valve housing, a float, a valve plate, a biasing means and a lever means The valve housing has an interior chamber and an outlet opening. The float is movably mounted in the interior chamber, and has a guide therein. The valve plate is movably mounted in the valve housing for opening and closing the outlet opening, and has a projection extending toward the outlet opening forming a pivot about which the valve plate can tilt. The biasing means forces the valve plate in a direction for closing the outlet opening. The lever means is coupled to the valve plate to tip and move the valve plate in directions for opening and closing the outlet opening in a continuous cycle, and includes a lever arm supporting the valve plate at a first end of the lever arm. A second end of the lever arm is pivotally connected to the guide in the float.

The valve plate can be tipped, dependent upon the pressure forces prevailing on the valve plate. The tipping movement frees the outlet opening, so that a secure opening and closing and a secure operation of the air bleed valve is guaranteed. Furthermore, undesired aerosol discharge, as well as liquid discharge, is avoided, because the operational movements of the air bleed valve of the present invention allows the valve, at any moment, in the position to close on short notice. By the lever arm and the defined pivoting of the valve plate around at least one pivot point, all of the essential functions of the air bleed valve can be combined in the smallest space. This permits a small structure for the air bleed valve.

Guiding the valve plate by the lever arm also guarantees secure and safe operation of the air bleed valve in any orientation. Opening of the valve occurs only when the outlet opening is directed upward. When the air bleed valve is in other positions, the opening remains securely closed. Any undesired leakage of operating medium is securely prohibited, which is not the case in conventional air bleed valves.

In one preferred embodiment of the air bleed valve according to the present invention, the lever arm second end is guided in a slot or channel through the float. The guide channel is obliquely arranged in a longitudinal direction of the float. With this arrangement, the major portion of the lever is guided in the float whatever the position of the float. By the lever being arranged completely within the float, a secure, problem-free guiding of the lever am is ensured.

In another preferred embodiment of the air bleed valve according to the present invention, the float has a valve seat on its end opposite the outlet opening. This valve seat closes off the inside of the valve housing and seals a connection bore for the connection of the air bleed valve. By virtue of this arrangement, with an opened air bleed opening in the form of the connection opening, no fluid can inadvertently pass into the inside of the valve housing, and therewith, into the attached installation parts.

In one especially preferred embodiment of the air bleed valve according to the present invention, the valve seat has a plug-like or journal-like extension with at least one connection opening. This connection opening can be brought at least partially into position covering the inside of the Journal-like extension. Without, as in known devices in the worst possible case, having to remove the air bleed valve from its connection bore, it is possible to attain an air bleed operation in the installation parts attached to the air bleed valve.

In another especially preferred embodiment of the air bleed valve according to the present invention, the valve plate outlet opening is provided with a conical point. The conical point permits continuous opening and closing of the outlet opening by engaging the opening such that the continuous cycle proceeds progressively. This also provides disturbance-free operation, requiring only low operational forces or energy, and permits a diminished float size.

Preferably, the biasing power source or energy accumulator is formed of a compression spring. One spring end is supported on the valve plate, while its other end is supported on the valve housing. By suitable selection of the prebiasing force of the compression spring, any inadvertent opening of the nozzle-like outlet opening at lower inside pressure is precluded. Simultaneously, the sprang prevents opening of the outlet opening when the air bleed system does not stand perpendicularly erect. Thus, if, for example, breakdown of the apparatus occurs, no leakage occurs.

In another especially preferred embodiment of the air bleed valve according to the present invention, the outlet opening opens into a filtering element. The filtering element is formed preferably of individual strainer disks or plates. With this arrangement, dirt can no longer penetrate into the valve housing and negatively influence the function of the valve according to the present invention.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 2A:
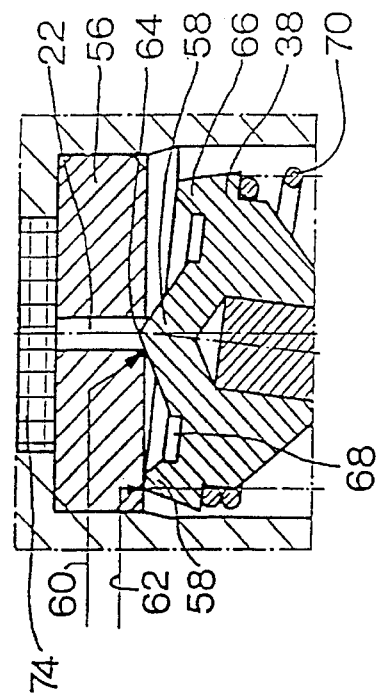
FIG. 2A is a partial, enlarged side elevational view in section of the air bleed valve of FIG. 2.

An air bleed valve, according to the present invention, consists essentially of a housing 10, a float 12 and a lever system 14. Air bleed valve housing 10 comprises a housing bottom part 16 with threaded journal 18 and a detachably attached, housing top part 20 with an outlet opening 22. The air bleed valve is coupled by threaded journal 18 with its outside threading being threaded into a filter housing 24 for ventilation. The valve housing-filter housing coupling seals the inside of filter housing 24 relative to the environment by means of a sealing border. Instead of the filter housing, a fluid-carrying conduit could also be ventilated. A gasket or packing 26 is inserted between bottom housing part 16 and cover-like top part 20. The overhanging and projecting border of bottom part 16 is folded inward forming a flange at this point.

At its top part 28 facing toward outlet opening 22, float 12 has a cylindrical outside peripheral surface attached to the float bottom part 30 directed toward the threaded journal. Float bottom part 30 has a seat valve 32 on its bottom. A clearance 34 is defined between the outside periphery or surface of float 12 and the inside periphery or surface of housing 10. The clearance widens slightly in diameter in the area adjacent filter housing 24. The air to be conducted out can pass through clearance 34 into the housing inside area between the top of float 12 and outlet opening 22.

Lever system 14 is formed of a rocker arm arrangement. A lever arm 36 in the form of a valve rod supports a moving member in the form of a valve plate 38 at one end. The valve plate is tightly or fixedly connected with the valve rod. The other end of lever arm 36 is guided over a sphere or spherical end 40, mounted pivotally in a guide in float 12. The guide is formed of a longitudinal slot 42 arranged in the middle and extending through the cylindrical float top part 28. The longitudinal slot 42 extends in the intermediate plane and in the plane of the drawing, and has a guide channel 44 for guiding the pivotal spherical end 40 of lever 36. As shown in the drawing, guide channel 44 extends from the middle of the bottom of float top part 28 obliquely upward to the top of float 12. At the top, guide channel 44 opens in a corresponding opening 46.

Figure 4A:
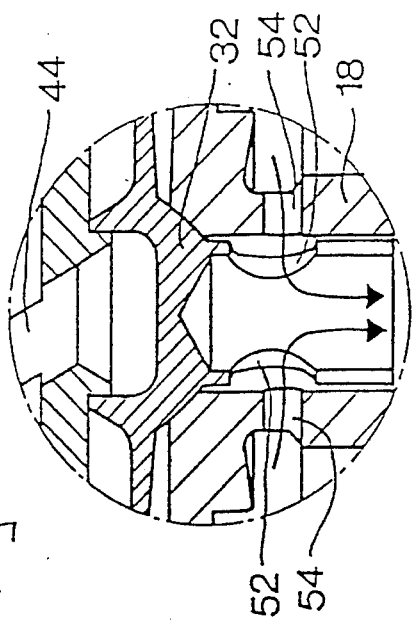
FIG. 4A is a partial, enlarged side elevational view in section of the air bleed valve of FIG. 4.
Figure 4:
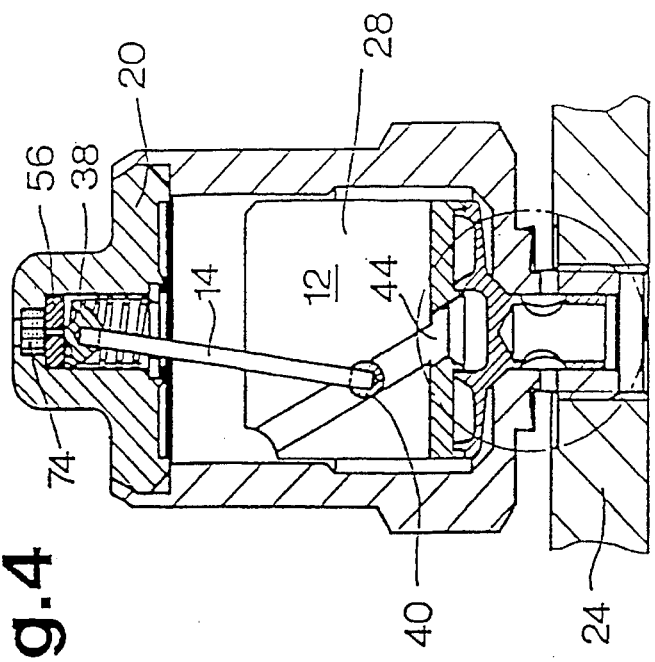
FIG. 4 is a side elevational view in section of the air bleed valve of FIG. 1, in position to bleed the filter housing.

Seat valve 32 is arranged in alignment with the longitudinal axis of float 12 on its bottom, and seals the inside of valve housing 10 closed with a seal relative to a connection bore 48. Connection bore 48 is threaded to engage threaded journal 18 for fastening of the air bleed valve on the top of filter housing 24. Seat valve 32 incorporates a journal-like extension 50 with two transverse and diametrically oppositely arranged connection openings 52. Openings 52 can be brought together with an air bleed opening 54 in threaded Journal is of valve housing 10 with the device covering the opening. When the valve is set in air bleed setting, opening 54 connects the surrounding environment with the inside of the journal-like extension 50 or with the inside of the threaded journal 18, which is shown in FIG. 4. This arrangement occurs as soon as the air bleed valve is raised by some screwing movements of filter housing 24.

Outlet opening 22 is part of a disk-shaped nozzle 56 mounted in top housing part 20. Nozzle 56, in combination with at least one projecting part 58 of valve plate 38 adjacent outlet opening 22, forms a pivot point 60, 62, about which valve plate 38 can be tipped to one side. To produce the first pivot or tipping point 60, valve plate 38 at the point of outlet opening 22 has a conical point 64 on projecting part 58. The conical point can be engaged in outlet opening 22 and increases in size for closing of outlet opening 22. Without loss of function, however, a spherical elevation (not shown) could be present at the site of point 64. For second pivot or tipping point 62, valve border 66 is provided around projecting part 58. Border 66 is flattened out on its side or surface facing toward nozzle plate 56. During opening of outlet opening 22, following the release of the first pivot point 60, progressive tipping movement of lever 36 causes second pivot point 64 to come in contact with nozzle 56. A circumferential annular groove 68 is provided on valve plate 38 between valve border 66 and point 64. The pivot and tipping axes of valve plate 38 and spherical end 40 of lever 36 extend parallel to one another.

A compression spring 70 is used as power source or energy accumulator, and is provided for cooperation with valve plate 38. The compression spring is supported with one end on valve plate 38 and its other end on valve housing 10. For supporting the spring other end, an annular disk or plate 72 is folded over as a flange in housing 10. As shown particularly in the detailed or enlarged drawings, outlet opening 22 opens on its side turned toward the outside environment into a filtering element 74, which is preferably formed of individual strainer disks or plates.

The force of the weight of the float is used to operate the valve mechanism. The operation of the float must thereby cause only a "hovering". For this, the specific weight of the float is selected so that this float is only slightly lighter than the operating medium. The float in this case preferably is produced of a plastic material by injection molding. Known constructions using the actuating force of the float directly for operation of the valve mechanism, on the contrary, require a great density differential between float body and operating medium. The great density differential can only be attained with use of large-volume hollow bodies, producing a great structural volume of the entire air bleed arrangement.

In the present invention, the force of the float weight is translated two-fold by lever system 14. The inclined guide bore 44 in float 12 generates a wedge effect on the closing part. The wedge effect is determined in each of its assumable positions by the length of lever 36 divided by the tangent of the angle of inclination of lever 36 in each of its assumable positions. The lever relationship around first pivot point 60 is greater than the factor 100 by the selected length of lever 36 and is obtained from this lever length in relationship to the outlet opening half-diameter or radius. The lever relationship around second pivot point 62, which is selected to be greater than the factor 10 by the length of lever 36, is obtained from this lever length relative to the outside radius of valve plate 38.

The following forces work on the nozzle opening or outlet opening 22 itself when there is high pressure in the housing, for instance in the form of filter housing 24 or a fluid-carrying conduit:

1. Pressure force from the surface of the outlet opening X inside pressure,
2. Spring prebias force of compression spring 70, and
3. Setting or adjusting force of lever system 14.

The first cited pressure being applied and the second cited spring prebias force both work to close the valve. On the other hand, the third cited setting or adjusting force works in opposition, having an opening effect on the air bleed valve. When the inside pressure is high, with the known commercial air bleed arrangements having weight operated valve mechanisms, the available setting force is not sufficient to be certain to cause opening of the air bleed valve. On the other hand, with force or pressure-operated air bleed systems, the thrusting force of the valve mechanism does not basically suffice to hold the outlet opening reliably closed at low inside pressure. With adjustment of the weight and volume of the float on operating media undertaken by the air bleed valve of the present invention, the medium having a density lower than 1 g per milliliter, and the arrangement of the valve mechanism in the form of lever system 14, these problems do not arise.

The function of the air bleed valve according to the present invention is explained in greater detail relative to the individual diagrammatic representations in the drawings.

A. Air Bleed During Operation

Figure 1A:
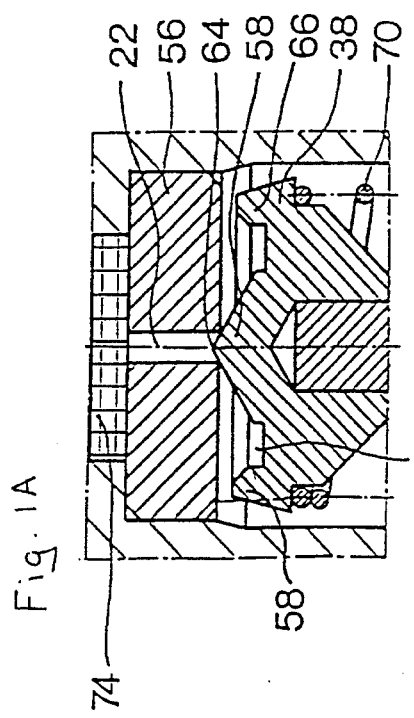
FIG. 1A is a partial, enlarged side elevational view in section of the air bleed valve of FIG. 1.
Figure 1:
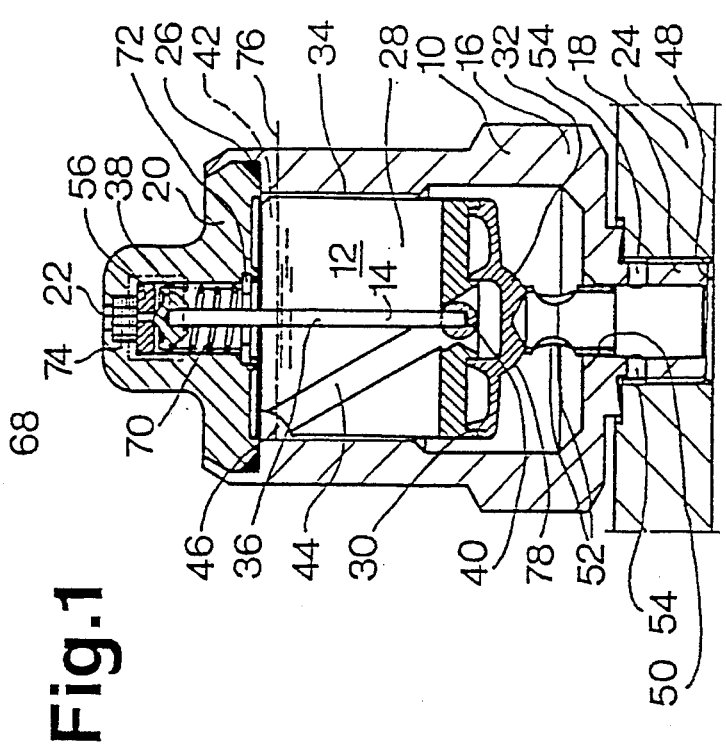
FIG. 1 is a side elevational view in section of an air bleed valve according to the present invention, with the float chamber filled and the outlet opening closed.

As shown in FIGS. 1 and 1A, when the float chamber is filled with operating medium (fluid), float 12 is in its highest position. Valve lever 36 extends perpendicularly. The pre-biased compression spring 70 presses valve plate 38 directly against outlet opening 22 of nozzle 56. Conical point 64 consequently closes off this opening.

Figure 2:
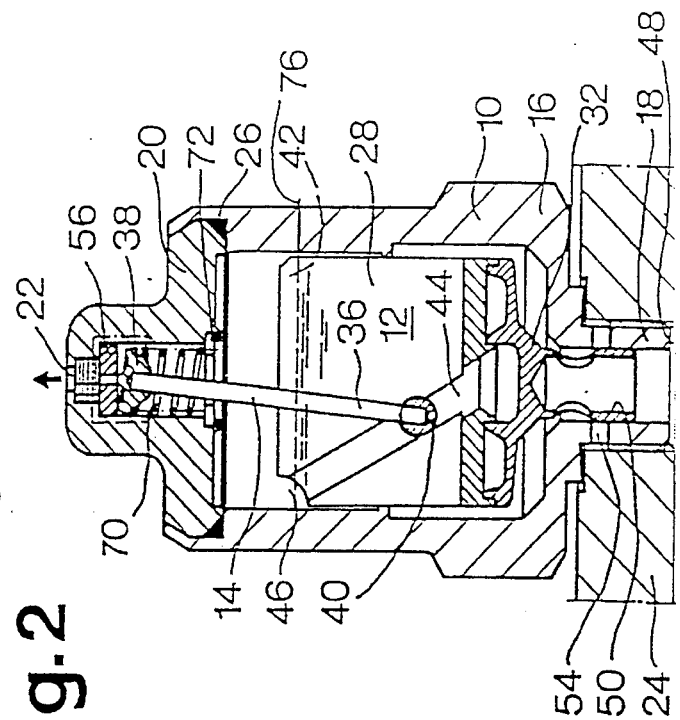
FIG. 2 is a side elevational view in section of the air bleed valve of FIG. 1, with a lowered liquid level in the float chamber and the outlet opening partially opened.

When the liquid level drops, as shown in the drawing with broken line 76, as a result of rising air volume in housing 10, float 12 is moved downward. Thus, the spherical end 40 of valve lever 36 is thrust to the side or laterally by guide 42 up into inclined bore 44. Valve plate 38 tips or pivots around first pivot point 60 at the point of its conical apex 64 until valve plate border 66 engages on the bottom of nozzle 56 to form the second pivot point 62. The resulting setting is shown in FIGS. 2 and 2A.

In this position, the grummet, sealing ferrule or stuffing cone 64 is already completely raised from its seat, and then enclosed air can dissipate into the atmosphere. Float 12 is then raised again by the rising liquid level 76, and nozzle opening 22 is closed, before liquid can be discharged.

Figure 3A:
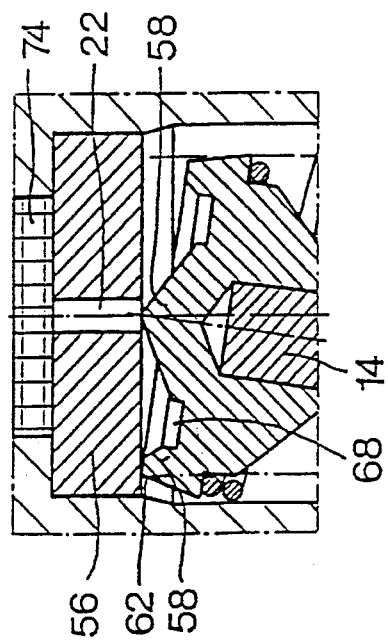
FIG. 3A is a partial, enlarged side elevational view in section of the air bleed valve of FIG. 3.
Figure 3:
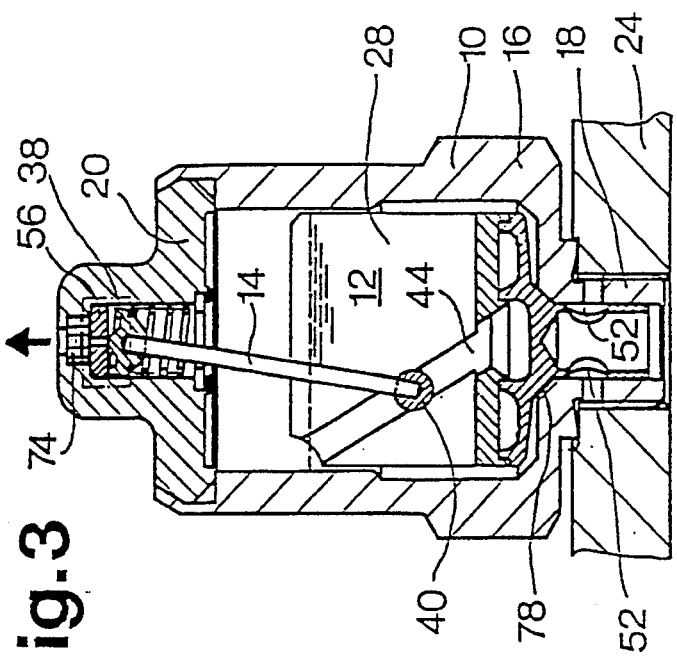
FIG. 3 is a side elevational view in section of the air bleed valve of FIG. 1, with a lowered liquid level in the float chamber and the outlet opening fully opened.

If liquid level 76 drops still further as a result of a greater volume of air, then valve lever 36 tips in the manner described above until it reaches the second pivot point 62 and then moves further around this second pivot point. The conical point is pivoted even further out of. outlet opening 22. The conical shape of point 64 consequently causes a rapidly progressing increase in the size of the free cross section of the nozzle opening (see FIGS. 3 and 3A).

The bottom of float 12, incorporating seat valve 32, is accessible over a crowned packing or sealing surface 78. The connection bore 48 in filter housing 24 is closed and sealed with certainty, as soon as float 12 assumes its bottommost position shown in FIG. 3. This prevents inadvertent air ingress from the outside through the air bleed valve into filter housing 24. How4ever, this also excludes any inadvertent idling or nonfunctioning of filter housing 24.

B. Air Bleed During Running of the Installation

When the filter installation is set in operation, generally, a considerable volume of air is contained in filter housing 24. To remove this air, the air bleed valve according to the present invention is brought to a high point within the installation. With an air-filled float chamber, the float 12 lies at the housing bottom 16 and closes connection bore 48 (see FIGS. 3 and 3A). The spherical end 40 of valve lever 36 is inclined to travel out to the side by the guiding of the spherical end in inclined bore 44 of the top part 28 of the float. Valve plate 38 lies with its second pivot point 62 engaging the bottom of disk-shaped nozzle 56. The air bleed opening in the form of outlet opening 22 is opened.

When the inside pressure in filter housing 24 rises, even if only slightly above the prevailing outside pressure, it raises float 12. Air under pressure then gets into the float chamber, in the inside of housing 10. From the float chamber the air passes through opened outlet opening 22 into the environment. In this manner, the air is removed from filter housing 24 until liquid level 76 reaches float 12 and raises it.

With the raising of float 12, the spherical end 40 of valve lever 36 is thrust as far as the middle axis. Valve lever 36 is pivoted or tipped around second pivot point 62. This continues until conical point 64 of valve plate 38 engages in outlet opening 22 on first pivot point 60 (see FIGS. 2 and 2A). Valve lever 36 then tips further around this first pivot point 60, until outlet opening 22 is completely closed off (see FIGS. 1 and 1A). Therefore, the closing of outlet opening 22 occurs before liquid level 76 can reach a level within housing 10 at which an undesired liquid discharge would occur.

C. Air Bleed of the Filter Housing

If filter housing 24 needs to be bled to drain the operating medium or to produce a pressure balance with the surrounding pressure, the air bleed valve is rotated out of connection bore 48 by a few rotations. The outside air can penetrate in through air bleed opening 54 and connection openings 52 (see FIGS. 4 and 4A). To facilitate the screwing in and out of the air bleed valve, housing bottom 16 is preferably provided with an outside hexagonal socket head.

While a particular embodiment has been chosen to illustrate the invention, it will be understood by those skilled in the art that various changes and modifications can be made therein without departing from the scope of the invention as defined in the appended claims.

I claim:

1. An air bleed valve, comprising:

a valve housing having an interior chamber and an outlet opening;

a float movably mounted in said interior chamber of said housing and having a guide therein, said guide including a guide channel extending in said float and extending obliquely and longitudinally along and relative to said float;

a value plate movable mounted in said value housing for opening and closing said outlet opening, said value plate having at least one projection extending toward said outlet opening forming a pivot about which said value plate can tilt;

a biasing means forcing said value plate in a direction for closing said outlet opening; and lever means, coupled to said valve plate, for tipping and moving said valve plate in directions for opening and closing said outlet in a continuous cycle, said lever means including a lever arm supporting said valve plate at a first end of said lever arm, a second end of said lever arm being pivotally connected, received and guided in said guided in said channel in said float.

2. An air bleed valve according to claim 1 wherein said valve plate comprises a conical point facing and mating with said outlet opening for opening and closing said outlet opening in a continuous and progressive cycle.

3. An air bleed valve according to claim 1 wherein said biasing means comprises a compression spring with opposite first and second ends, said first end being supported on said valve plate, said second end being supported by said valve housing.

4. An air bleed valve according to claim 1 wherein said outlet opening opens into a filter element.

5. An air bleed valve according to claim 4 wherein said filter element comprises individual strainer disks.

6. An air bleed valve, comprising:

a valve housing having an interior chamber, an outlet opening and a connection bore in an end thereof remote from said outlet opening;

a float movably mounted in said interior chamber of said housing and having a guide therein, said float having a valve seat on an end thereof remote from said outlet opening, said valve seat being releasably engagable with said connection bore for closing and sealing said interior chamber at said connection bore;

a valve plate movably mounted in said valve housing for opening and closing said outlet opening, said valve plate having at least one projection extending toward said outlet opening forming a pivot about which said valve plate can tile;

a biasing means forcing said valve plate in a direction for closing said outlet opening; and lever means, coupled to said valve plate, for tipping and moving said valve plate in directions for opening and closing said outlet opening in a continuous cycle, said lever means including a lever arm supporting said valve plate at a first end of said lever arm, a second end of said lever arm being pivotally connected in said guide in said float;

whereby, said interior chamber can be closed and sealed at said connection bore during mounting of the air bleed valve.

7. An air bleed valve according to claim 6 wherein said guide comprises a guide channel extending in said float which receives and guides said second end of said lever arm, said guide channel extending obliquely and longitudinally along and relative to said float.

8. An air bleed valve according to claim 6 wherein said valve housing comprises an air bleed opening extending from said connection bore; and said valve seat comprises a tubular extension having at least one connection opening, said connection opening being movable relative to said air bleed opening to and from a first position with said connection opening and said air bleed opening being at least partially overlapping;

whereby, an air bleed point of the air bleed valve can be connected with an outside environment through said air bleed opening and said connection opening.

9. An air bleed valve according to claim 6 wherein said valve plate comprises a conical point facing and mating with said outlet opening for opening and closing said outlet opening in a continuous and progressive cycle.

10. An air bleed valve according to claim 6 wherein said biasing means comprises a compression spring with opposite first and second ends, said first end being supported on said valve plate, said second end being supported by said valve housing.

11. An air bleed valve according to claim 6 wherein said outlet opening opens into a filter element.

12. An air bleed valve according to claim 11 wherein said filter element comprises individual strainer disks.

* * * * *